INVENTORS
OTTO D. ERLANDSON
BURTON F. JUDSON

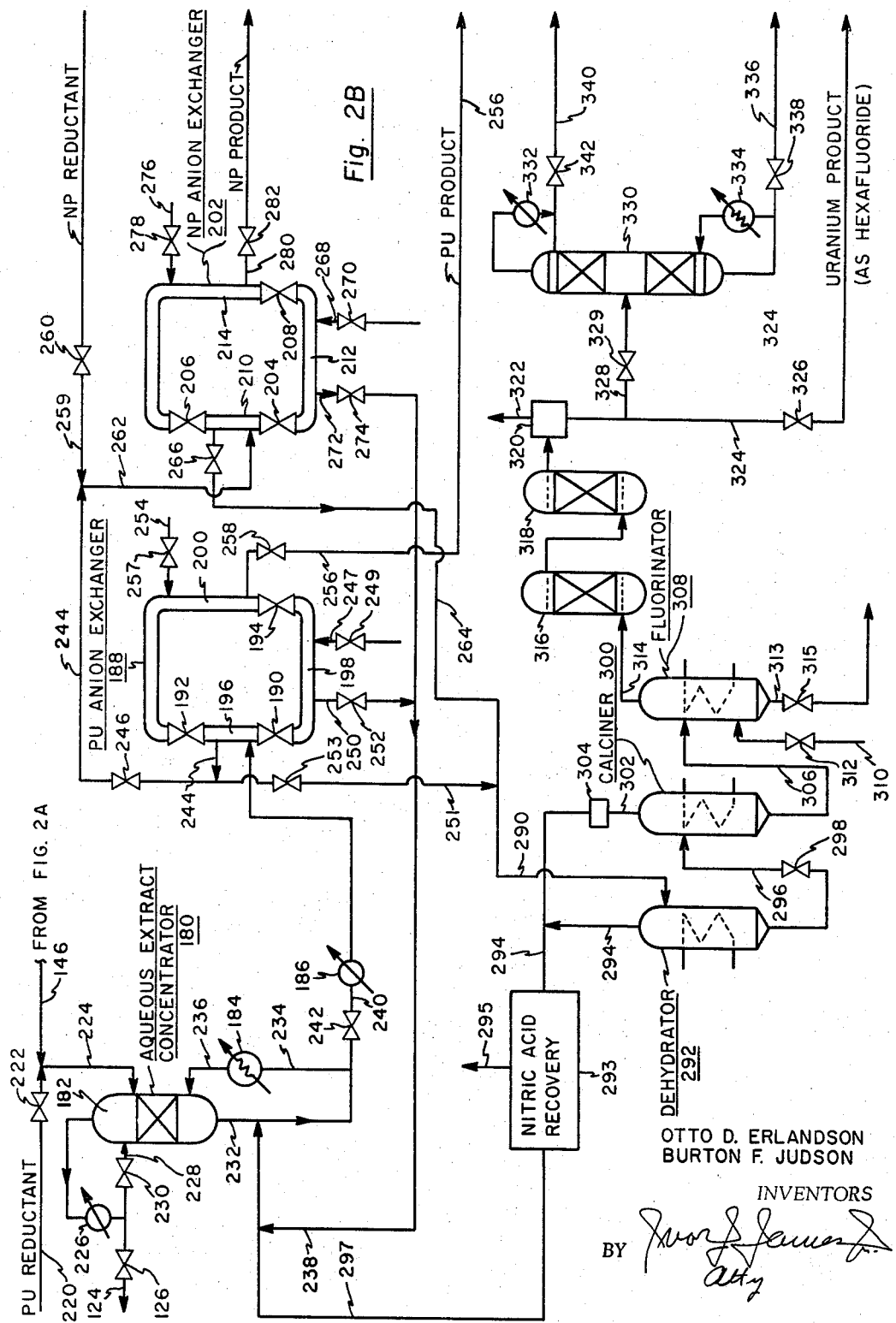

United States Patent Office 3,374,068
Patented Mar. 19, 1968

3,374,068
IRRADIATED FUEL REPROCESSING
Otto D. Erlandson, Saratoga, and Burton F. Judson, Monte Sereno, Calif., assignors to General Electric Company, a corporation of New York
Filed Nov. 17, 1966, Ser. No. 595,151
8 Claims. (Cl. 23—326)

ABSTRACT OF THE DISCLOSURE

This describes a process for the reprocessing of irradiated fuel from nuclear chain fission reactors, and in particular discloses an improved chemical process capable of separating certain transuranic irradiation products from one another and from uranium and fission products. In this process the bulk of the fission products formed by irradiation of the fuel is first separated as a mixture without partition from the uranium and transuranics (plutonium and neptunium) by extraction with an organic solvent, the fission products stream is dehydrated and calcined and these materials are recovered as an oxide mixture, the uranium and transuranics are recovered from the solvent as a mixture with substantially reduced amounts of fission products, the transuranics are separated from the uranium (and from each other if desired) by contact with and elution from anion exchange resins, the uranium stream is dehydrated and calcined to produce uranium oxide containing trace fission oxides, this substantially plutonium-free oxide mixture is fluorinated, and uranium hexafluoride is recovered as a product substantially free of fission product fluorides.

Disclosure

Figure 1:
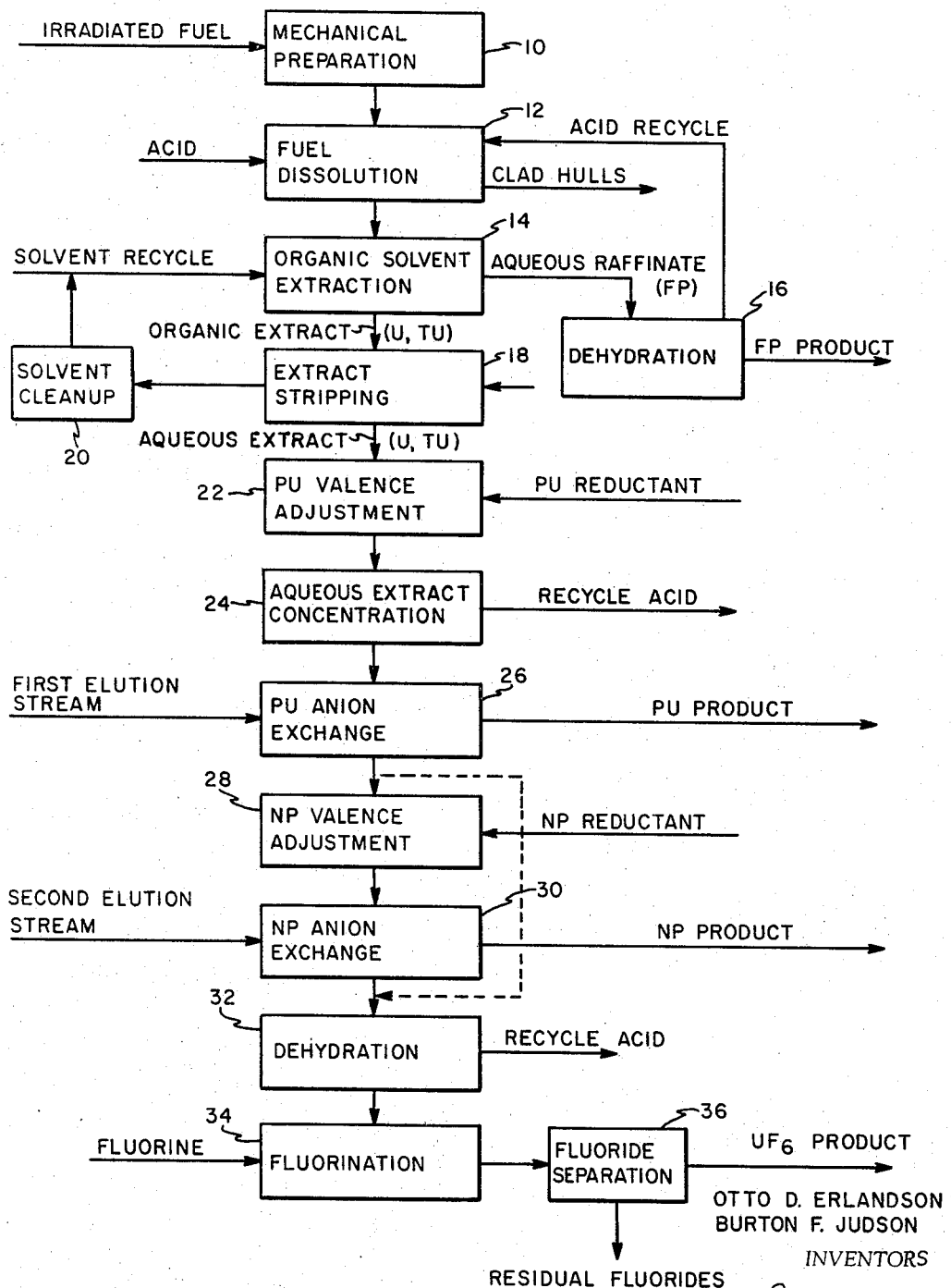

Nuclear chain fission reactions and the reactors in which such reactions are accomplished are now well known. In general, a nuclear reactor is made up of a chain reacting assembly including nuclear fuel material contained in fuel elements having various geometric shapes such as plates, tubes, or rods. These fuel elements are usually provided with a corrosion-resistant non-reactive heat conductive layer or clad on their external surfaces. In power reactors, these elements are usually grouped together at fixed distances from one another in a coolant flow channel or region forming what is termed a fuel bundle. A sufficiently large number of such bundles are combined together in the chain reacting assembly or core to permit a controllable self-sustained nuclear fission chain reaction. The reactor core is enclosed within a container through which the reactor coolant is circulated. In thermal neutron spectrum reactors, a neutron moderator is also provided, and in some cases this moderator may also perform as the reactor coolant. The known boiling water and pressurized water reactors are examples of such thermal reactors.

The nuclear fuel material contains fissionable atoms such as $U^{233}$, $U^{235}$, $Pu^{239}$, or $Pu^{241}$. This material may be in elemental or compound form. Upon absorption of a neutron by the nucleus of such a fissionable atom, a nuclear disintegration frequently results. This produces on the average two fission product atoms of lower atomic weight and of great kinetic energy. Also released in such a disintegration are several neutrons of high energy. For example, in the fission of $U^{235}$ atoms, light fission product atoms of mass number ranging between 80 and 110 and heavy fission product atoms of mass number ranging between 125 and 155 are produced. On the average, 2.5 neutrons per fission event are released. The total energy released approaches 200 mev. (million electron volts) per fission.

The kinetic energy of the fission product atoms as well as that of the fission neutrons is quickly dissipated producing heat in the fuel elements of the reactor. Some additional heat is generated directly in the reactor structural materials, in the coolant, and any moderator present, due to radiation effects. If there is one net neutron remaining on the average from each fission event and this neutron induces a subsequent fission event, the fission reaction becomes self-sustaining and is thus called a chain reaction. Heat generation may be maintained and the heat is removed by passing a coolant fluid through heat exchange relationship with the fuel elements. The fissionable atoms are thus gradually consumed. Some of the fission product atoms produced are strong neutron absorbers (fission product poisons). Thus the fission reaction tends to decrease and cannot be maintained indefinitely at a given level.

In some nuclear reactor fuel elements, fertile atoms such as $U^{238}$ may be included in addition to the above noted fissionable atoms. A fairly common currently used nuclear power reactor fuel material consists of enriched uranium dioxide ($UO_2$) in which approximately 2.0% of the uranium atoms are $U^{235}$ which are readily fissionable by thermal neutrons, while the remaining 98% is $U^{238}$ which is not so fissionable to any significant degree. In the course of operating a reactor fueled with such fissionable and fertile atoms, the fissionable atoms ($U^{235}$) originally present are gradually consumed and simultaneously neutron irradiation of the fertile atoms ($U^{238}$) converts a part of them into additional fissionable atoms ($Pu^{239}$). Initially, the concentration of these newly created fissionable atoms gradually rises with irradiation and then approaches an equilibrium value. These atoms are also readily fissionable by thermal neutrons and thus contribute to the maintenance of the chain fission reaction so that the reaction may be continued longer than would have been the case if only the original charge of fissionable atoms were available.

Since the rate at which fissionable atoms are created by fertile atom conversion is (except in the breeder-converter type of reactor of special design) always less than the rate at which the original fissionable atom charge is consumed during operation, the reactor can maintain this heat generation at a given power level for only a finite length of time. Thereafter, the maximum power level at which the reactor can be operated must be decreased and finally the reactor must be shut down for refueling. Some or all of the irradiated fuel bundles are removed and replaced with new fuel bundles having a higher concentration of fissionable atoms and no fission product poisons. The reactivity of the refueled reactor core is higher and the original power level can thus be restored.

The irradiated reactor fuel removed from the reactor ordinarily contains a valuable unconsumed quantity of the original fissionable material as well as a significant quantity of fissionable material (the fissionable atoms) converted from any fertile material (the fertile atoms) which may have been a component of the original fuel. Irradiated fuel also may contain fission products (the fission product atoms) or transuranic isotopes (or both) which are of substantial value. In addition to plutonium referred to above, one such transuranic is the neptunium isotope $Np^{237}$, which is formed from neutron irradiation of $U^{235}$ and $U^{238}$ in accordance with the following reactions:

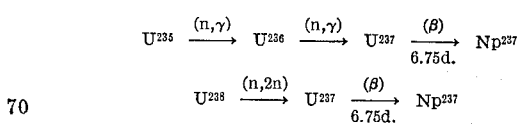

While $Np^{237}$ may have other uses, one current use is in the production of Pu²³⁸ by further neutron irradiation in accordance with the following reaction:

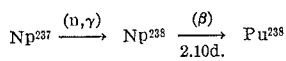

Pu²³⁸ is a long lived (89 year half-life) energetic alpha particle emitter, the radioactive decay of which yields thermal energies at rates sufficient to power direct thermal-to-electrical energy conversion devices.

Accordingly, it is highly desirable to reprocess the irradiated fuel to recover and separate the fissionable and fertile materials for reuse, and to recover transuranic isotopes such as plutonium for use in reactor fuels and Np²³⁷ for use in production of Pu²³⁸, or other uses.

One particularly advantageous irradiated fuel reprocessing system is described and claimed in U.S. Patent No. 3,222,124, issued Dec. 7, 1965, to H. W. Alter and C. R. Anderson. In this process, an acid solution of the irradiated fuel is contacted with an anion exchange resin to separate plutonium from the uranium and fission products, the plutonium is recovered from the resin and subsequently purified, the uranium-fission product fraction is dehydrated and calcined to the oxide form, the mixed oxides are fluorinated and the volatile uranium hexafluoride is separated from the fission product fluorides of different volatility.

The present invention is directed to an improvement in the process of U.S. Patent No. 3,222,124.

The objects and advantages of this invention will become apparent to those skilled in this art as the description and illustration of the invention proceed.

Figure 2A:
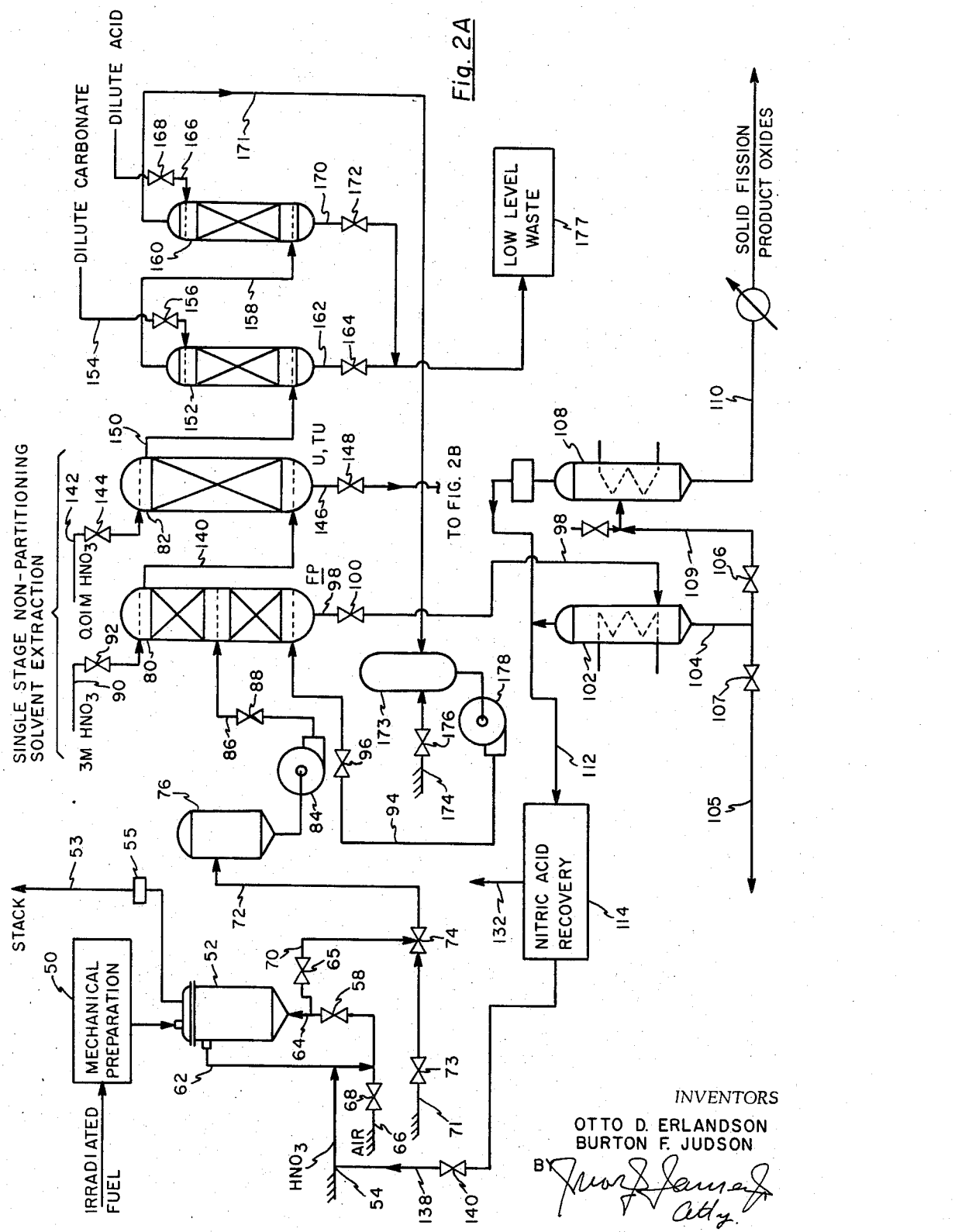

The present invention will be more readily understood by reference to the following detailed description which includes references to the accompanying drawings in which:

FIGURE 1 is a simplified block diagram illustrating the basic principles of the process of the present invention; and FIGURES 2A and 2B are flow diagrams illustrating in detail the process of this invention.

Referring now more particularly to FIGURE 1, irradiated nuclear reactor fuel is introduced to mechanical preparation zone 10. Here the flow channels, lifting bales, nose pieces, and other non-fuel-containing removable parts of the fuel bundle are removed. If desired, mechanical disassembly of the fuel bundle such as by separating individual fuel rods, may also be performed. In one preferred embodiment, the individual fuel rods are further chopped into short sections about three inches long. In another preferred embodiment of the invention, the entire full length fuel rods are passed through a rolling and punching mechanism which perforates the clad and crushes to a slight extent the fuel material contained within the fuel element. Each of these latter two operations is designed to increase the access of the dissolving acid to the fuel material.

The mechanically prepared fuel is introduced into fuel dissolution zone 12. In this step the irradiated fuel is contacted with a strong mineral (such as nitric) acid to dissolve the fuel material, preferably leaving the clad metal (such as zirconium or stainless steel) substantially unaffected. This treatment produces an aqueous acid dissolver solution of the uranium and transuranic irradiation products (plutonium and neptunium), and fission products which may be separated from undissolved clad hulls by decantation, filtration, or similar operations.

The fuel solution is introduced into organic extraction zone 14 wherein it is countercurrently contacted with an organic solvent. There are a number of known organic solvents suitable for making this separation, including the paraffinic hydrocarbon solution of tributyl phosphate, dialkyl ethers, dibutyl Carbitol, and others. The uranium and transuranic (plutonium and neptunium) concentrate in the organic solvent extraction extract phase and are thus separated from the fission products which are substantially all retained in the aqueous solvent extraction raffinate phase.

The aqueous solvent extraction raffinate from zone 14 may be subjected to further processing. For example, it may be introduced into dehydration zone 16. Here the fission products are recovered in solid form for further processing or for disposal. In processes where the fuel has been dissolved in a volatile acid such as nitric acid, the solvent extraction raffinate may be heated to evaporate water and to recover a substantial part of the acid for reuse. The fission product solids remaining may be calcined to produce a substantially anhydrous fission product oxide stream.

The organic extract from zone 14 is introduced into organic extract stripping zone 18 where the extract is countercurrently contacted with a dilute (approximately 0.01 molar) solution of nitric acid. The dilute nitric acid strips out the neptunium, plutonium, and uranium forming an aqeuous solvent extraction extract containing these materials and leaving the organic solvent for treatment in solvent clean-up zone 20 and recirculation to extraction zone 14.

The aqueous solvent extraction extract is introduced into plutonium valence adjustment zone 22 into which is introduced a thermally destructable plutonium reductant such as amino guanidine, ferrous ion, semicarbazide, ascorbic acid, or a hydroxylamine salt. Preferably this reductant is hydroxylamine nitrate, which is a thermally decomposable, fast acting agent which produces no residual solid material. The preferred reductant is introduced to make the solution approximately 0.02 molar in hydroxylamine nitrate. This reduces the higher valance state plutonium to a valence of 3[Pu (III)] and the higher valence neptunium to a valence of 4[Np (IV)].

The thus reduced solvent extraction extract from zone 22 is introduced into concentration zone 24. In this step this extract is rapidly added to a boiling solution of strong nitric acid, and is concentrated by evaporation by a factor of about two. This renders ineffective the reductant introduced in zone 22 and oxidizes and stabilizes the plutonium as an anionic hexanitrato complex containing Pu (IV). Simultaneously the neptunium present is oxidized substantially entirely to valences greater than 4[Np (>IV)], possibly a mixture of Np (V) and Np (VI).

The concentrated stabilized solvent extraction extract thus produced is cooled to approximately 60° C. and is introduced into plutonium anion exchange zone 26. Here the solution is contacted with a bed of an anion exchange resin of the strong base quaternary amine type, such as those available commercially under the trade names Permutit SK, Dowex-1, and the like. The plutonium [Pu (IV)] is preferentially extracted by the resin, and the neptunium [Np (>IV)] and uranium are substantially unaffected under these conditions and pass through forming first aqueous anion exchange raffinate. Subsequently, the resin is scrubbed with strong nitric acid to remove uranium and fission product materials, and the resin bed containing the plutonium is then treated with dilute nitric acid as a first elution stream to produce a plutonium [Pu (IV)] product stream substantially free of uranium, neptunium, and fission products.

If recovery of neptunium is not desired, the first anion exchange raffinate containing uranium, neptunium, and a trace of fission products may be introduced directly into dehydration zone 32, otherwise this first raffinate is treated as follows.

The first anion exchange raffinate, containing Np (>IV) and uranium, is then treated in neptunium valence adjustment zone 28 with a second thermally destructable reductant, such as a mixture of ferrous ion and hydrazine, and in sufficient amount to reduce Np (>IV) to Np (IV). Simultaneously, trace amounts of plutonium not extracted in zone 26 and which may be present in the first raffinate are reduced to Pu (III). The reduced first raffinate is subsequently maintained at a temperature of about 60° C. to render the second reductant ineffective and stabilize the neptunium as Np (IV) and to reoxidize and stabilize traces of plutonium as Pu (IV). An alternate neptunium reductant would be semicarbazide.

In this condition and maintained at approximately the same temperature, the stabilized reduced first anion exchange raffinate is introduced into neptunium anion exchange zone 30 where it is contacted with a second bed of anion exchange resin of the same type referred to above in describing the plutonium anion exchange zone 26. In zone 30, the neptunium as Np (IV) is preferentially extracted by the resin while the uranium passes through substantially unaffected and is discharged as a second anion exchange raffinate. The thus treated resin is subsequently scrubbed with strong nitric acid containing ferrous ion and hydrazine to remove uranium, plutonium, and fission product materials. Following this the scrubbed resin is treated with a second elution stream comprising dilute nitric acid thereby displacing the Np (IV) as a product solution substantially free of plutonium, uranium, and fission products.

The second anion exchange raffinate is then introduced into dehydration zone 32 where it is heated to remove water and residual acid and to produce an anhydrous solid material containing the uranium as uranium trioxide ($UO_3$). The recovered acids are recirculated for reuse in the process. The substantially plutonium and neptunium-free anhydrous solids are discharged from zone 32 and are introduced into fluorination zone 34. Here the $UO_3$ is directly fluorinated with elemental fluorine to convert the $UO_3$ to uranium hexafluoride.

The fluorinated material is then introduced into fluoride separation zone 36 in which the uranium hexafluoride is separated from other fluorides which may be present, including the trace of fission product fluorides.

The utilization in this invention of a single stage non-partitioning organic solvent extraction step to effect a preliminary separation of fission products from the uranium and transuranic irradiation products effects a marked improvement in the process operations which follow it, as well as in the overall process. It eliminates the need for a special filtration or other clarification treatment of the feed streams to the anion exchange operations; it substantially reduces the fission product load and the attendant radiation and nitrite damage in the anion exchange zones 26 and 30, and greatly facilitates the transuranic valence control in zones 22 and 28; it substantially reduces fission product ruthenium volatilization problems in dehydration zone 32; it nearly eliminates control problems in fluorination zone 34 otherwise associated with volatile fission product tellurium, iodine, molybdenum, antimony, niobium, technetium, and ruthenium; it eliminates the need for special means otherwise required to accommodate fission product decay heat generation in fluorination zone 34 and fluoride separation zone 36; it substantially eliminates gaseous and residual solids disposal problems otherwise associated with operations in fluorination and fluoride separation zones 34 and 36; it reduces substantially the shielding otherwise required for equipment in the ion exchange and the fluoride separation zones 26, 30, and 36; it concentrates the fission products in an otherwise salt-free nitrate solution which is amenable to relatively straightforward calcination in zone 16; it permits fission product and transplutonium isotope recovery from solutions substantially free of process reagent residues; among others.

EXAMPLE I

Referring now to FIGURE 2A, a schematic flow diagram of one embodiment of the invention is shown. The description of FIGURE 2 is conducted in the form of a specific example of the present invention applied to the reprocessing of irradiated $UO_2$ type power reactor fuel which has been irradiated to approximately 20,000 mwd./t. (megawatt-days/ton of uranium). Irradiated fuel is received in the form of bundles approximately 10 feet long and 3.75 inches square. The bundles consist of 6 x 6 square array of fuel rods approximately 0.5 inch in diameter clad with a tube of zirconium alloy and originally containing $UO_2$ of about 2.0% enrichment (2.0% $U^{235}$). The relative quantities of uranium, transuranics (plutonium and neptunium), and fission products present in such irradiated fuel and expressed as though in elemental form are approximately as follows:

Table 1.—Irradiated fuel composition

| | Kg. |
|---|---|
| U | 1,000 |
| Pu | 6.9 |
| Np | 0.35 |
| Fission products | 12 |

The irradiated fuel bundles are introduced into mechanical preparation zone 50. Here the channels, lifting bales, and nose pieces are removed and the fuel rods are chopped into pieces approximately three inches long. The thus treated fuel is introduced into dissolver 52 for dissolution. The dissolving agent is strong nitric acid. Make-up acid is introduced through line 54 along with recycle acid introduced through line 138 to form an approximately 7 molar solution. This solution is recirculated through dissolver 52 and lines 62 and 64 provided with valve 58 by means of an air lift in which air is introduced through line 66 and valve 68. The lift air and gases released during fuel dissolution are vented to a stack 53 through gas clean-up means 55, such as scrubbers, silver reactors, and filters.

Upon dissolution of the fuel material and with valve 58 closed, the aqueous dissolver solution is discharged through lines 64, 70 and valve 65 by means of jet pump 74 through line 72 into run tank 76 at a rate controlled by valve 73 in steam inlet line 71. The solution is approximately 3 molar in nitric acid at the end of a dissolving cycle. Undissolved clad metal hulls held in a basket not shown is removed from dissolver 52 and following removal of the dissolver solution a subsequent charge of irradiated fuel is introduced. The dissolver cycle is repeated and the dissolver solutions thus produced are accumulated in run tank 76.

The solvent extraction and extract stripping operations are carried out in columns 80 and 82. These columns are of known construction and may be provided with contacting plates, trays, or solid packing to enhance the liquid-liquid contact. Preferably, the columns are of the pulsed type to obtain adequate contact and flow of the organic solvent and aqueous streams. In extraction column 80 the organic phase is the continuous phase, and the aqueous phase is discontinuous. In stripping column 82 the organic phase is discontinuous and the aqueous phase is continuous.

The dissolver solution is passed from run tank 76 by means of pump 83 through line 86 and valve 88 into an intermediate point of solvent extraction column 80. This solution contains about 360 grams/liter of uranium as uranium nitrate hexahydrate, and is about 3 molar in nitric acid. Nitric acid of about 3 molar concentration is introduced at the top of column 80 through line 90 and valve 92, at a volumetric flow rate approximately equal to that of the feed. A normal dodecane solution of tributyl phosphate is introduced at the bottom of column 80 through line 94 and valve 96. The volumetric flow rate of the solvent is approximately 400% of the column 80 feed. In the portion of column 80 below the feed point, the organic solvent countercurrently contacts the aqueous nitric acid feed solution and extracts the uranium, plutonium, neptunium, and some of the fission products into the organic solvent. The organic phase rises in the column past the feed point into the upper portion of the column. Here the organic extract is countercurrently contacted with the nitric acid which serves to scrub from the organic phase substantially all of the fission products. These materials return downward through the column in the aqueous phase past the feed point into the lower zone for retreatment.

From the bottom of column 80 through line 98 and valve 100, an aqueous solvent extraction raffinate is produced containing the major portion of the fission products, as well as residual traces of uranium and transuranics, and is introduced into dehydration zone 102. Here the solvent extraction raffinate is boiled to evaporate water and concentrate the nitrate salt solution. This solution may be passed through lines 104 and 105 and valve 107 for further processing to recover special radioactive materials. Otherwise, the solution passes through lines 104 and 109 and valve 106 into calciner 108. If desired, to this solution may be added diluent materials which upon calcination form diluent-fission product solids having improved waste storage characteristics. Such materials include zinc nitrate, aluminum nitrate, and the alkali and alkaline earth metal borates, phosphate, and silicates. In any event, calcination decomposes the nitrate salts, evolves nitric acid and mixed oxides of nitrogen, and produces the fission products in anhydrous form. The anhydrous solids are discharged from calciner 108 through line 110 and are sent to suitable shielded storage.

The water vapor, nitric acid vapors, and mixed oxides of nitrogen evolved in zones 102 and 108 are passed through line 112 into nitric acid recovery system 114. Noncondensible gases (principally nitrogen) are removed and sent to stack 53 through line 132. The concentrated nitric acid produced is recirculated to dissolver 52 through line 138 and valve 140.

From the top of column 80 through line 140 at the overflow rate is removed the organic extract containing the uranium, plutonium, and neptunium, and a trace of the fission products. This constitutes the feed introduced at the bottom of solvent stripping column 82. Dilute (approximately 0.01 molar) nitric acid is introduced at the top of column 82 through line 142 and valve 144, at a flow rate about equal to the column 82 feed rate. The organic phase rises through column 82 countercurrent to the descending dilute nitric acid. Under these conditions the nitric acid extracts the uranium, plutonium, and neptunium from the organic phase producing a lean solvent and an aqueous solvent extraction extract. This extract is removed from the bottom of column 82 through line 146 and valve 148 and is further treated as described below for separation and recovery of the uranium, plutonium, and neptunium.

The column 82 overhead, consisting of the lean organic solvent, is introduced through line 150 into alkaline washing column 152. A dilute solution of sodium carbonate is introduced through line 154 and valve 156 counter-currently contacting the solvent which passes through line 158 into acid washing column 160. The aqueous waste is withdrawn through line 162 and valve 164. The solvent in column 160 is contacted with dilute nitric acid introduced through line 166 and valve 168. Aqueous waste discharges through line 170 and valve 172. Reconditioned solvent is returned from column 160 through line 171 to tank 173. Make-up solvent may be added through line 174 and valve 176, and organic solvent is returned by pump 178 and line 94 back to column 80. The aqueous waste streams are discharged into low (radioactivity) level treatment and disposal zone 177 for immobilization such as by application of asphalt blending techniques.

It should be noted that this solvent extraction operation just described does not involve a partition or separation of uranium from the plutonium and neptunium, but is rather a separation of these materials as a mixture from the major part of the fission products and insoluble finely divided solid residues carried over from the dissolver 52. Furthermore, the nitric acid concentration in the aqueous phase in extraction column 80 is maintained at relatively high values (about 3 molar or above) to suppress extraction by the organic phase of fission products which are volatile as fluorides (such as ruthenium).

From the bottom of column 82 through line 146 is removed the aqueous solvent extraction extract containing the uranium, plutonium, and neptunium, and with a trace of fission products, and has approximately the following composition:

Table 2.—Aqueous extract

| | Grams/liter |
|---|---|
| U | 90 |
| Pu (IV), (VI) | 0.6 |
| Np (IV), (V), (VI) | 0.03 |
| $HNO_3$ | 0.2 |

In that portion of FIGURE 2B illustrating the process steps for recovering the plutonium and neptunium, the principal equipment items are the solvent extraction extract concentrator 180 provided with steam stripper 182 and reboiler 184; cooler 186; plutonium anion exchanger 188 provided with isolation valves 190, 192, and 194 dividing the exchanger into plutonium extraction zone 196, scrubbing zone 198, and plutonium elution zone 200; and neptunium anion exchanger 202 provided with isolation valves 204, 206, and 208 dividing the exchanger into neptunium extraction zone 210, scrubbing zone 212, and neptunium elution zone 214.

The solvent extraction extract at a temperature of about 45° C. is introduced through line 146 and valve 148 into admixture with a sufficient quantity of a thermally destructible plutonium reductant (such as aminoguanidine, semicarbazide, ferrous ion, ascorbic acid) and preferably hydroxylamine nitrate introduced through line 220 and valve 222. This is controlled to raise the reductant concentration in the extract to about 0.02 molar. The liquid mixture flows through line 224 into the top of steam stripper 182 where it passes downwardly countercurrent to rising stream of water vapor and nitric acid vapor volatilized in reboiler 184. Overhead vapors are condensed in condenser 226 and returned in part through line 228 and valve 230 as reflux to steam stripper 182 and in part recycled through line 124 and valve 126, and may be introduced at the top of solvent stripping column 82.

During the passage of the solvent extraction extract-plutonium reductant mixture through line 224 and downwardly through steam stripper 182, the plutonium reduction to Pu (III) and the neptunium reduction to Np (IV) are completed, reactions which under these conditions require a time which may range from about 3 to about 10 minutes and an acid concentration not exceeding about 2 molar. This reduction could be accomplished in any suitable reaction equipment providing that amount of time and these conditions, but in any event must be allowed to proceed to completion prior to introduction of the mixture rapidly into the high acidity concentrator bottoms stream recirculated in reboiler 184. Recirculating through reboiler 184 and lines 232, 234, and 236, together with highly acidic plutonium and neptunium scrub effluents recycled through line 238, is the concentrator bottoms stream maintained at boiling conditions, in this example approximately 110° C., and having approximately the following composition:

Table 3.—Concentrator bottoms

| | | |
|---|---|---|
| U | grams/liter | 180 |
| $HNO_3$ | molar | 7 |
| Pu (IV) | grams/liter | 1.2 |
| Np (IV) | do | 0.06 |

As the solvent extraction extract-plutonium reductant mixture passes downwardly from steam stripper 182 and is rapidly mixed with the boiling 7 molar nitric acid concentrator bottoms stream, the reductant is destroyed, the 7 molar nitric acid oxidizes the neptunium present to Np (>IV) and oxidizes and stabilizes the plutonium as Pu (IV). The thus reduced stabilized extract concentrate is removed through line 240 and valve 242 and is cooled to about 60° C. in cooler 186. In this condition, the concentrate is in condition for separation of plutonium from the neptunium and uranium in plutonium anion exchanger 188. The nitric acid concentration maintained in reboiler 184 is of critical importance to the successful adjustment of the plutonium and neptunium valences. For this purpose the acidity of the concentrator bottoms stream must be sufficient to form the hexanitratoplutonium complexes, namely at least about 4 molar in nitric acid, and preferably about 7 molar.

Both anion exchangers 188 and 202 shown in FIGURE 2B are commercially available semi-continuous movable bed anion exchange resin contact equipment, although stationary resin bed equipment could also be used. This equipment will not be described further in detail except to note that in operation the various fluid streams flow through the individual contact zones 196, 198, and 200; 210, 212, and 214) while the isolation valves (190, 192, and 194; 204, 206, and 208) are closed and the resin bed is stationary, that by conventional means not shown the resin bed may be moved a predetermined amount periodically in a counterclockwise direction (as the equipment is illustrated in FIGURE 2B) while the fluid flows are terminated and the isolation valves are open, and that following closure of the isolation valves the fluid flows are resumed thus providing a semi-continuous extraction scrubbing, and elution system.

The concentrator bottoms stream, having the composition given in Table 3, is introduced through line 240 and passed through plutonium extraction zone 196 of plutonium anion exchanger 188. Plutonium is extracted by the resin substantially quantitatively forming a first anion exchange raffinate which is discharged through line 244. This stream has the following approximate composition:

*Table 4.—First anion exchange raffinate*

| | |
|---|---|
| U _____grams/liter__ | 165 |
| HNO$_3$ _____molar__ | 6.5 |
| Pu _____ | Trace |
| Np (IV) _____grams/liter__ | 0.06 |

The resin present in scrubbing zone 198, previously loaded with plutonium on passage through extraction zone 196, is scrubbed with 6 molar nitric acid at a temperature of 60° C. and introduced through line 247 and valve 249 to remove trace amounts of uranium and fission product contaminants acquired in extraction zone 196. The resulting plutonium scrub effluent is removed from scrubbing zone 198 through line 250 and valve 252 and returned through line 238 for retreatment in reboiler 184.

The resin present in plutonium elution zone 200, scrubbed substantially free of contaminants, is contacted with 0.6 molar nitric acid as a first elution stream at a temperature of about 60° C. introduced through the 254 and valve 256. This elutes the plutonium from the resin and produces through line 258 and valve 260 a first aqueous elution effluent which is the plutonium product solution having the following composition:

*Table 5.—Plutonium product solution*

| | |
|---|---|
| Pu _____grams/liter__ | 15 |
| HNO$_3$ _____molar__ | 4.5 |

This stream may be further treated in a concentrator not shown, equipment resembling reboiler 184, to produce an aqueous plutonium nitrate solution of approximately 250 grams/liter concentration.

If recovery of neptunium is not desired, the first anion exchange raffinate produced from plutonium extraction zone 196 through line 244, may be passed (with valve 246 closed) through line 251 and valve 253 to the uranium recovery facilities described subsequently. Otherwise the first raffinate is treated as follows:

The first raffinate solution produced from plutonium extraction zone 196 and having the composition given in Table 4 and at a temperature of about 60° C. is passed through line 244 and valve 246 and combined with a thermally destructible neptunium reductant introduced at about 20° C. through line 258 and valve 260. The reductant has the following composition:

*Table 6.—Neptunium reductant*

| | Molar |
|---|---|
| Ferrous ion _____ | 1 |
| Hydrazine nitrate _____ | 2 |
| HNO$_3$ _____ | 1 |

The amount of neptunium reductant so added is controlled to reduce all Np (>IV) to Np (IV), which may be done by maintaining a reductant concentration of approximately 0.02 molar in the mixture. This also reduces any plutonium present to Pu (III), but at the operating temperature of 60° C. the reductant is ultimately destroyed after which the plutonium reoxidizes to Pu (IV) in the solution. However, the neptunium remains as Np (IV). Another suitable neptunium reductant is semicarbazide. The first thus treated first raffinate is then introduced as feed through line 262 to neptunium anion exchanger 202.

This exchanger is essentially identical in structure and operation to the plutonium anion exchanger 188 described above. The second anion exchange raffinate discharges from neptunium extraction zone 210 through line 264 and valve 266, being an aqueous nitric acid solution of uranyl nitrate having approximately the following composition:

*Table 7.—Uranium solution*

[Second anion exchange raffinate]

| | |
|---|---|
| U _____grams/liter__ | 160 |
| HNO$_3$ _____molar__ | 6.3 |
| Ferric ion _____do____ | 0.02 |

This uranium stream is further treated as described below.

A nitric acid scrub solution at about 60° C. and having approximately the following composition is introduced into scrubbing zone 212 through line 268 and valve 270:

*Table 8.—Neptunium scrub*

| | Molar |
|---|---|
| Ferrous ion _____ | 0.02 |
| Hydrazine _____ | 0.04 |
| HNO$_3$ _____ | 6 | and produces through line 272 and valve 274 a neptunium scrub effluent which is returned through line 238 to reboiler 184.

The thus loaded and scrubbed resin in elution zone 214 is contacted at a temperature of about 60° C. with 0.6 molar nitric acid as a second elution stream introduced through line 276 and valve 278 and produces through line 280 and valve 282, the neptunium product solution having the following approximate solution:

*Table 9.—Neptunium product solution*

| | |
|---|---|
| Np _____grams/liter__ | 1.2 |
| HNO$_3$ _____molar__ | 3 |

This product solution may be further treated in a concentrator not shown, equipment resembling reboiler 184, to produce an aqueous neptunium nitrate solution of approximately 40 grams/liter.

The second anion exchange raffinate stream produced from neptunium anion exchanger 202 through line 246 (or the first raffinate produced from plutonium anion exchanger 188 through lines 244 and 251 in the event neptunium recovery is not desired), is the uranium bearing stream substantially free of plutonium, neptunium, and fission products. This aqueous stream is passed by means of line 290 into dehydrator 292 where the solution is evaporated to form a concentrated solution of between 60% and 100% uranium nitrate hexahydrate. The water and dilute nitric acid evolved are passed through line 294 into second nitric acid recovery zone 293. Non-condensible gases from zone 293 are sent through line 295 to stack 53. The recovered nitric acid may be recycled in the process, such as by return through line 297 to reboiler 184.

The concentrated solution from dehydrator 292 is passed through line 296 and valve 298 into calciner 300. Here the concentrated solution is calcined at a temperature of about 300° C. which converts the uranium substantially completely to uranium trioxide ($UO_3$) and the selected fission products to their respective oxide forms. Residual moisture, nitric acid, and mixed oxides of nitrogen are removed through line 302 and may be introduced for nitric acid recovery in zone 293. Some fission product ruthenium may also volatilize in this calcining step, and it is removed from the evolved gases by contact absorption means 304.

The calcined solids are removed from calciner 300 through line 306 and are directly introduced into fluorination zone 308. These materials are contacted by elemental fluorine at a temperature between about 300° C. and 600° C. to convert the uranium trioxide to uranium hexafluoride and the trace amounts of fission products which may be present to their respective fluorides. The fluorine is introduced through line 310 and valve 312.

The fluorination step product vapors comprise primarily a mixture of uranium hexafluoride and a trace of plutonium, neptunium, and fission product fluorides. Periodically solid fluorides are removed from fluorinator 308 through line 313 and valve 315 and may be sent to low level waste facility 177. The fluorinator 308 overhead vapors are passed by means of line 314 into and through sorption columns 316 and 318 to remove traces of fluorides other than uranium hexafluoride. The uranium hexafluoride stream, containing non-condensible gases are passed into cold trap 320. The non-condensibles are sent through line 322 to stack 53. The vaporized materials, essentially uranium hexafluoride, intermittently removed from cold trap 320 is produced as the process product through line 324 and valve 326. If desired, the uranium hexafluoride may be further purified by passing it through line 328 and valve 329 into distillation in column 330 provided with overhead condenser 332 and reboiler 334. In this case, contaminated uranium hexafluoride is removed through line 336 and valve 338 and may be recycled to fluorinator 308. The overhead is the further purified uranium hexafluoride process product removed through line 340 and valve 342.

From the foregoing it will be seen that the combination of a preliminary non-partitioning solvent extraction and stripping operation greatly enhances the anion exchange operations, in which plutonium (and neptunium if desired) is recovered, and the fluorination operations in which uranium hexafluoride is produced. The several specific advantages and improvements found to result have been discussed above.

Although a particular embodiment of this invention has been described in considerable detail by way of example, it should be understood that various modifications and adaptations thereof may be made by those skilled in this particular art without departing from the spirit and scope of this invention as defined in the following claims.

We claim:

1. In the process for treating irradiated nuclear reactor fuel to recover uranium and at least one transuranic isotope selected from the class consisting of neptunium and plutonium substantially free of fission products which comprises dissolving said fuel in a strong mineral acid forming an aqueous dissolver solution, and subsequently treating said dissolved solution to separate said uranium and said transuranic isotope therefrom substantially free of said fission products, the improvement in separating said uranium, said transuranic isotope, and fission products from one another which comprises contacting said dissolver solution with a lean organic solvent forming an organic extract containing said uranium and transuranic isotope and forming an aqueous solvent extraction raffinate containing said fission products, dehydrating said aqueous raffinate to recover said fission products therefrom, stripping said organic extract to produce said lean organic solvent and an aqueous solvent extraction extract containing said uranium and said transuranic isotope, contacting said aqueous extract with an anion exchange resin to extract said transuranic isotope forming an aqueous anion exchange raffinate containing said uranium, eluting said transuranic isotope from said resin, dehydrating said aqueous anion exchange raffinate and calcining the resulting solids to convert said uranium to uranium oxide, and fluorinating said uranium oxide to produce uranium hexafluoride as a product.

2. A process according to claim 1 in combination with the step of maintaining the acid concentration in said dissolver solution at a value of at least about 3 molar during contact with said organic solvent to inhibit extraction by said solvent of fission products which are volatile as fluorides.

3. A process according to claim 1 wherein said dissolver solution is contaminated with insoluble finely divided solid residues, in combination with the steps of maintaining said organic solvent as the continuous phase during contact with said dissolver solution and maintaining said organic extract as the discontinuous phase during the stripping of said organic extract, whereby said insoluble solid residues are preferentially concentrated with soluble fission products in said aqueous solvent extraction raffinate.

4. A process according to claim 1 wherein said organic extract also contains a trace of said fission products which contaminate said solvent extraction extract, in combination with the steps of scrubbing said anion exchange resin with a scrub stream following contact with said aqueous solvent extraction and prior to elution of said transuranic isotope therefrom to remove fission products from said resin as a scrub effluent and permit elution of said transuranic isotope as a substantially fission product-free product from said resin, recirculating said scrub effluent into combination with said aqueous solvent extraction extract, whereby said trace of fission products appears in said aqueous anion exchange raffinate with said uranium and is fission product fluorides in admixture with said uranium hexafluoride, and separating said uranium hexafluoride from said fission product fluorides.

5. A process according to claim 1 wherein said transuranic isotope is plutonium.

6. A process according to claim 1 wherein said transuranic isotope is neptunium.

7. In a process for recovering uranium and at least one transuranic isotope selected from the class consisting of neptunium and plutonium from an aqueous dissolver solution of irradiated nuclear reactor fuel including fission products and insoluble finely divided solid residues and in which said transuranic isotope is extracted from said dissolver solution by means of an anion exchange resin in the presence of said uranium leaving an aqueous raffinate containing said uranium and fission products, said transuranic isotope is eluted from said resin, said raffinate is dehydrated and calcined to a mixture of uranium oxide and fission product oxides, said mixture of oxides is fluorinated in the substantial absence of said transuranic isotope to form a mixture of uranium hexafluoride and fission product fluorides, and said mixture of fluorides is fractionated to recover said uranium hexafluoride, the improvement which comprises contacting said dissolver solution as the discontinuous phase with a lean organic solvent as the continuous phase forming an organic extract containing said uranium and said transuranic isotope and forming an aqueous solvent extraction raffinate containing the major part of said fission products including said solid residues, stripping said organic extract to produce said lean organic solvent and to produce an aqueous solvent extraction extract containing said uranium and said transuranic isotope and a minor part of said fission products but substantially free of said solid residues, extracting said transuranic isotope by means of said anion exchange resin from said solvent extraction extract in the substantial absence of said solid residues to produce an anion exchange raffinate substantially free of said transuranic isotope, and dehydrating said aqueous solvent extraction raffinate and calcining the resulting solids to produce said fission products and solid residues as an oxide mixture substantially free of said uranium and said transuranic isotope.

8. A process according to claim 7 in combination with the step of controlling the dissolver solution acidity at a value of at least about 3 molar to inhibit the extraction of fission product ruthenium by the organic solvent thereby substantially eliminating ruthenium fluoride from the mixture of uranium hexafluoride and fission product fluorides.

References Cited
UNITED STATES PATENTS

| | | | |
|---|---|---|---|
| 2,950,166 | 8/1960 | Seaborg | 23—341 X |
| 3,222,124 | 12/1965 | Anderson | 23—338 X |

L. DEWAYNE RUTLEDGE, *Primary Examiner.*

CARL D. QUARFORTH, *Examiner.*

S. TRAUB, R. L. GRUDZIECKI, *Assistant Examiners.*